L. W. GRISSOM.
AUGER.
APPLICATION FILED AUG. 16, 1911.
1,037,616.
Patented Sept. 3, 1912.
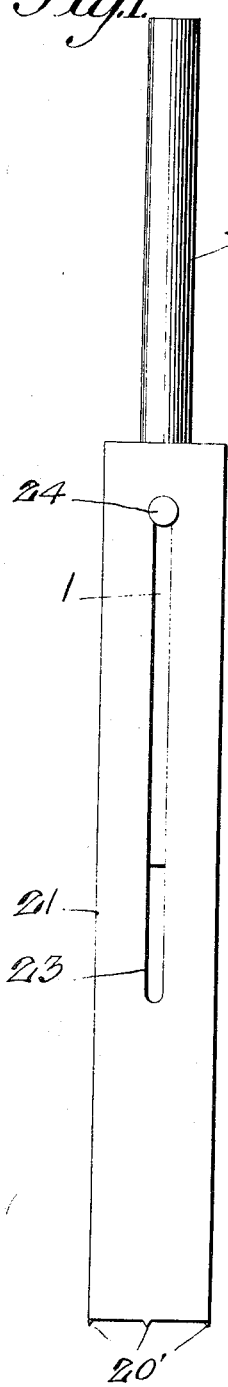
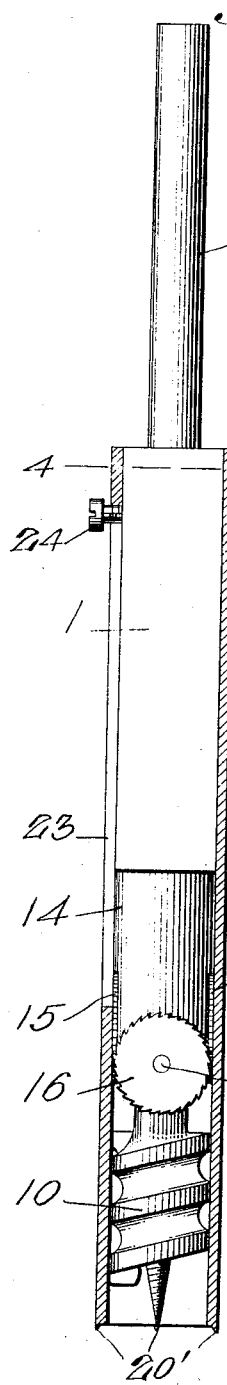
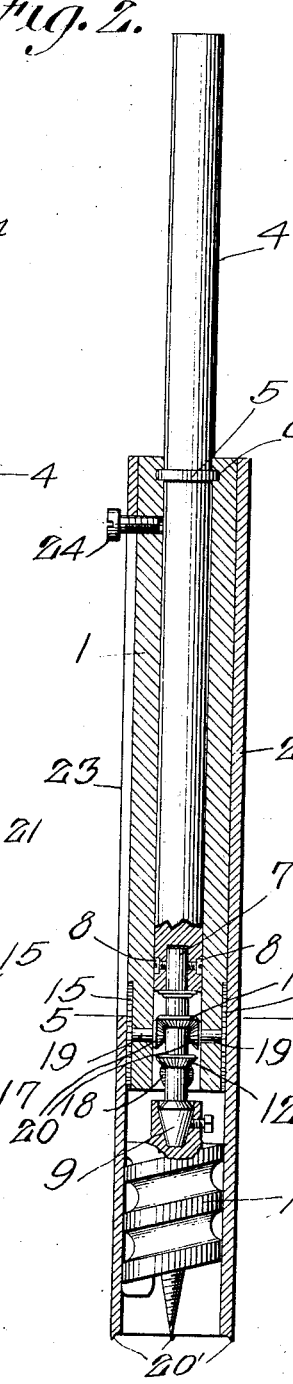
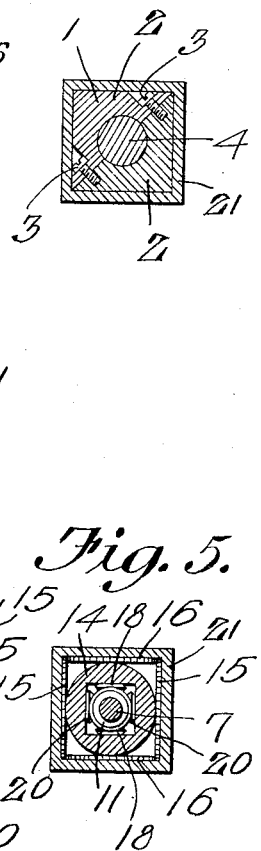
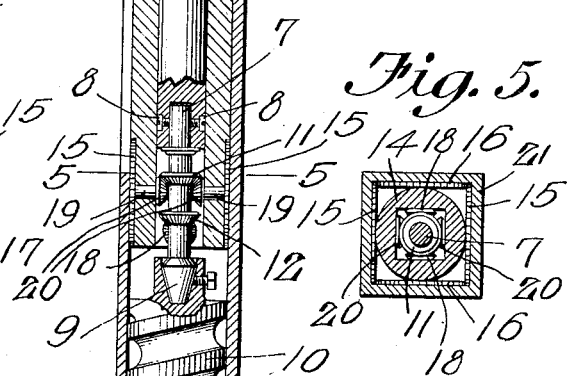
Louis W. Grissom, Inventor
Witnesses
by C. A. Snow & Co., Attorneys

UNITED STATES PATENT OFFICE.

LOUIS WILEY GRISSOM, OF DURHAM, NORTH CAROLINA.

AUGER.

1,037,616.      Specification of Letters Patent.      Patented Sept. 3, 1912.

Application filed August 16, 1911. Serial No. 644,357.

*To all whom it may concern:*

Be it known that I, LOUIS W. GRISSOM, a citizen of the United States, residing at Durham, in the county of Durham and State of North Carolina, have invented a new and useful Auger, of which the following is a specification.

It is the object of the present invention to provide a tool in which a rotatably mounted member is made effective to operate a series of angularly disposed saws, whereby the rotation of said member will operate the saws to cut a rectangular hole.

A further object of the invention is to provide a combined boring and mortising machine, including a bit, fashioning a circular hole, and angularly disposed saws giving to the hole formed by the bit, a rectangular contour.

A further object of the invention is to provide novel means for operating the saws, and to provide novel means for maintaining the tool properly positioned with respect to the work.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a side elevation; Fig. 2 is a sectional elevation; Fig. 3 is a longitudinal section, parts being in elevation; Fig. 4 is a transverse section on line 4—4 of Fig. 2; and Fig. 5 is a transverse section on line 5—5 of Fig. 3.

In carrying out the invention there is provided, as a primary and fundamental element, a holder, denoted generally by the numeral 1. The holder, in its upper portion, is preferably rectangular in contour, and is divided diagonally, in its longer dimension, to form separable parts 2, united by means of screws 3, or by other connecting elements adapted to a like end. Journaled for rotation in the holder 1, is an operating member comprising a shank 4, provided with a collar 5, adapted to register rotatably in mating recesses in the holder 1, the engagement between the collar 5 and the recesses 6 serving to prevent relative longitudinal movement between the shank 4 and the holder 1.

Mounted in the lower end of the shank 4, and protruding slightly beyond the holder 1, is a stem 7, held in place by set screws 8, or in any other desired manner, the exposed end of the stem 7 being tapered, as shown at 9, to fit into a bit 10.

Carried by the stem 7, and located within the bore of the holder 1, are superposed, beveled pinions 11 and 12. The lower end of the holder 1 is preferably of circular contour, as shown at 14. Applied to the circular portion 14 of the holder 1, is a pair of oppositely disposed circular saws 15. Likewise applied to the circular portion 14 of the holder 1, is another pair of oppositely disposed circular saws 16. The saws 16 are located below the saws 15, the saws 16 being rectangularly disposed with respect to the saws 15. Owing to the fact that the saws 15 are located above the saws 16, it will be seen that the peripheries of the sets of saws may be extended, so that when the several saws are operated, a square or a rectangular hole will be cut in the work, the hole being cut clean and clear, to the corners thereof.

Journaled for rotation in the portion 14 of the holder 1 are oppositely disposed shafts 17, to which the lower saws 16 are secured. Upon these shafts 17, are beveled pinions 18, meshing into the beveled pinions 12 upon the stem 7. Located above the shafts 17, and journaled for rotation in the portion 14 of the holder 1, are other shafts 19, to which the saws 15 are operatively connected. The shafts 19 carry beveled pinions 20, meshing into the pinions 11 upon the stem 7.

Surrounding the holder 1, and mounted for reciprocation thereon, is a tubular casing 21, having at its lower end, projections 20′, adapted to be engaged with the work. In the casing 21, there is a longitudinally extended slot 23 receiving a set screw 24, threaded into the holder 1. The set screw 24 serves to retain the casing 21 in place upon the holder 1, and the set screw may be rotated into engagement with the shaft 4, when it is desired that there shall be no relative movement between the shaft 4 and the holder 1.

The operation of the device as hereinbefore described, is as follows: The projections 20′ of the casing 21 are engaged with the work, and the shaft 4 is rotated, whereupon, the pinions 11 and 12, meshing into the pinions 20 and 18, will cause a rotation of the shafts 17 and 19, operating the saws 16 and 15, these saws cutting to a rectangular contour, the circular hole bored by the bit 10. Owing to the fact that the saws 15 are elevated with respect to the saws 16, this rectangular opening will be cleared to the extreme corners thereof.

Owing to the fact that the lower end of the holder 1 is rounded, as shown at 14, space will be provided to receive the material cut away by the saws 15 and 16, it being understood that the rounded portion 14 of the holder 1 is extended to any desired degree, depending up the thickness of the material which is to be cut.

It will be seen that, if desired, the bit 10 may be removed, the entire cutting operation being carried on by the saws 15 and 16, the bit 10 being a useful, but not absolutely necessary element.

Having thus described the invention, what is claimed is:—

1. In a device of the class described, an operating member and a holder, one of which is provided with a groove, the other of which is provided with a collar to register in the groove, the operating member being journaled in the holder; a stem mounted in the operating member; a securing element entering the side of the operating member and engaging the stem, the holder surrounding the operating member closely to prevent a displacement of the securing element; shafts journaled for rotation in the holder, transversely of the operating member; angularly disposed, rotatable cutting elements carried by the outer ends of the shafts; and intermeshing beveled pinions upon the shafts and upon the stem; the holder consisting of transversely separable parts; and means for securing the parts of the holder together, to maintain the collar engaged in the groove and to maintain the holder engaged with the securing element.

2. In a device of the class described, an operating member and a holder, one of which is provided with a groove, the other of which is provided with a collar to register in the groove, the operating member being journaled in the holder; a stem mounted in the operating member; a securing element entering the side of the operating member and engaging the stem, the holder surrounding the operating member closely to prevent a displacement of the securing element; shafts journaled for rotation in the holder, transversely of the operating member; angularly disposed, rotatable cutting elements carried by the outer ends of the shafts; and intermeshing beveled pinions upon the shafts and upon the stem; the holder consisting of transversely separable parts; a member securing the parts of the holder together to maintain the collar engaged in the groove and to maintain the holder engaged with the securing element; and a casing in which the holder is mounted to slide, the casing engaging the last specified member to prevent a separation of the parts of the holder.

3. In a device of the class described, an operating member; a stem removably carried by the operating member; a holder receiving the operating member for rotation, and comprising laterally separable parts; shafts journaled in said parts; cutting members carried by the outer ends of the shafts and disposed parallel to the operating member, and intermeshing beveled pinions upon the shafts and upon the stem, the separation of the parts of the holder permitting the removal of the stem from the operating member, and permitting the pinions upon the shafts and upon the stem, respectively, to be moved out of mesh.

In testimony that I claim the foregoing as my own, I have hereto affixed my signature in the presence of two witnesses.

LOUIS WILEY GRISSOM.

Witnesses:
WILLIAM D. COMBS,
D. B. CARTER.